United States Patent [19]

Braga et al.

[11] Patent Number: 5,712,323
[45] Date of Patent: Jan. 27, 1998

[54] CROSS-LINKED ATACTIC OR AMORPHOUS PROPYLENE POLYMERS

[75] Inventors: Vittorio Braga; Franco Sartori, both of Ferrara, Italy

[73] Assignee: Montell North America Inc., Wilmington, Del.

[21] Appl. No.: 679,690

[22] Filed: Jul. 11, 1996

[30] Foreign Application Priority Data

Jul. 12, 1995 [IT] Italy ................................. MI95A1490

[51] Int. Cl.⁶ ............................................. C08F 8/06
[52] U.S. Cl. ........................ 522/73; 522/74; 525/284; 525/322; 525/333.7; 525/333.8; 525/376; 525/385; 525/387
[58] Field of Search ................... 522/73, 74; 525/284, 525/322, 333.7, 333.8, 376, 385, 387

[56] References Cited

U.S. PATENT DOCUMENTS

| | | | |
|---|---|---|---|
| 4,176,097 | 11/1979 | Fox et al. | 428/355 |
| 4,305,990 | 12/1981 | Kelly | 525/98 |
| 5,210,136 | 5/1993 | Miller et al. | 525/78 |

FOREIGN PATENT DOCUMENTS

| | | |
|---|---|---|
| 729984 | 9/1986 | European Pat. Off. . |
| 604917 | 7/1994 | European Pat. Off. . |

*Primary Examiner*—Bernard Lipman

[57] ABSTRACT

Essentially atactic cross-linked propylene homopolymer or amorphous cross-linked random copolymer of propylene with ethylene and/or at least one $C_4$–$C_{10}$ α-olefin. Polymer composition comprising the above mentioned cross-linked atactic or amorphous polymers and other olefin polymers. Foamed polymer or polymer composition obtained by foaming said cross-linked atactic or amorphous polymers or said polymer composition.

Process for the preparation of said polymer or foamed polymer composition.

20 Claims, No Drawings

CROSS-LINKED ATACTIC OR AMORPHOUS PROPYLENE POLYMERS

Present invention concerns cross-linked atactic or amorphous propylene polymers, more precisely a cross-linked atactic propylene homopolymer and its amorphous cross-linked random copolymers, and the process for the preparation of said cross-linked polymers.

The cross-linked polymers of the present invention can be used for the preparation of thermoplastic products having elastic properties. In particular they are suitable for the production of foamed products.

The cross-linked polymers of the present invention offer the advantage of combining properties such as flexibility, and other properties typical of elastomers, resistance to high temperatures, and can be handled in a manner typical of a thermoplastic composition. Such a combination of elastic properties and workability was until now obtainable by a way of a dynamic vulcanization of compositions comprising a thermoplastic matrix (for instance, a propylene homopolymer) and a dispersed elastomeric phase (for instance, an EPR or EPDM copolymer) in certain proportions. Surprisingly, the cross-linked polymers of the present invention can be handled, for instance compression or injection moulding, without being dispersed in a thermoplastic matrix. Therefore, the polymer suitable for the present invention can be employed both as such and as a blend with other olefin polymers in any proportion. The reason why the above mentioned properties may also be found in cross-linked copolymers is explained by the fact that such copolymers do not contain a high amount of ethylene. Thanks to this, although the copolymers are cross-linked, they are not thermosetting, which is typical of cross-linked elastomeric polymers known in the prior art, on the contrary they are still mouldable even if they have been subjected to the action of heat.

The workability of the cross-linked polymer of the present invention allows one to reutilize the products manufactured from the cross-linked atactic or amorphous polymers of the present invention and to convert them into new products. Thus the thermoplastic property renders the cross-linked atactic or amorphous polymers of the present invention completely recyclable, reducing at the same time the problem connected with their disposal as waste products.

Therefore, the object of the present invention is an essentially atactic cross-linked propylene homopolymer and an amorphous cross-linked random copolymer of propylene with ethylene and/or a $C_4$–$C_{10}$ α-olefin.

The $C_4$–$C_{10}$ α-olefins, linear or branched, are preferably selected from 1-butene, 1-pentene, 4-methyl-1-pentene, 1-hexene and 1-octene.

The quantity of ethylene as comonomer which is present in the copolymer ranges preferably from 0.1 to 20%, more preferably from 1 to 20%, by weight with respect to the weight of the copolymer.

The quantity of $C_4$–$C_{10}$ α-olefins as comonomer which is present in the copolymer ranges preferably from 0.1 to 50%, more preferably from 1 to 20%, by moles.

The uncross-linked atactic or amorphous polymers suitable for the preparation of the cross-linked polymers of the present invention preferably have an intrinsic viscosity [η] ranging from 1 to 3.5, more preferably from 1.5 to 3.5 dL/g. For example, suitable for the present invention are those polymers that have the following characteristic:

%(r)—% (m)>0, where %(r) is the percentage of the syndiotactic dyads and %(m) is the percentage of the isotactic dyads;

Examples of polymers suitable for the present invention are those homopolymers that, in addition to the above-mentioned characteristics, have:

less than 2% of the $CH_2$ groups are contained in the $(CH_2)_n$ sequences where n is $\geq 2$;

the Bernoulli index (B)=1±0.2.

The Bernoulli index is defined as:

$$B=4[mm][rr]/[mr]_2$$

where [mm], [rr] and [mr] represent, respectively, the percentage of the isotactic triads, syndiotactic triads, and heterotactic triads in the polymer. Said percentage is determined by way of $^{13}$C-NMR analysis. Said index values are close to 1, in particular ranging from 0.8 to 1.2, preferably from 0.9 to 1.1.

Examples of polymers suitable for the present invention are those random amorphous copolymers that, as further characteristics, have less than 2% of the $CH_2$ groups of the polymer chain contained in the $(CH_2)_n$ sequences where n is even. Preferably, in said copolymers the percentage molar content of ethylene (%E) and the ratio PEP/(PEP+PEE+EEE) satisfy the following relationship:

$$0.12\%E+PEP/(PEP+PEE+EEE) \geq 1,$$

where PEP, PEE and EEE represent, respectively, the sequences propylene/ethylene/propylene, propylene/ethylene/ethylene and ethylene/ethylene/ethylene.

The definition "amorphous or essentially atactic polymers" refers to those polymers that have a substantially atactic structure, where the quantity of the isotactic dyads is not much different from that of the syndiotactic dyads. The above notwithstanding, it has been observed that the quantity of syndiotactic dyads (r) in said polymers is greater than that of the isotactic dyads (m), i.e., %(r)31 %(m)>0, preferably %(r)–%(m)>5. These polymers have virtually no crystallinity.

Essentially atactic homopolymers (hereinafter referred to as "atactic") and amophus random copolymers having the above characteristics are described in published European patent application EP-A-604,917 and European patent application 96103117.6, respectively, both on behalf of Spherilene.

Said atactic or amorphous polymers are obtained with homogeneous catalysts based on metallocenes of Zr, Ti, and Hf.

The atactic and amorphous polymers mentioned above are generally soluble in the usual solvents for olefin polymers, in particular in xylene. Thanks to the effect of cross-linking, a polymer that is insoluble in xylene at room temperature (25° C.) is produced. In particular, the amount of xylene-insoluble polymer at room temperature in the cross-linked polymers of the present invention is less than 85% by weight, preferably from 10% to 75%, with respect to the whole weight of the polymer.

Also an object of the present invention is a polymer composition comprising from 10 to 90% by weight, preferably from 25 to 90%, of a cross-linked polymer selected from an essentially atactic propylene homopolymer and amorphous random copolymers of propylene with ethylene and/or at least one $C_4$–$C_{10}$ α-olefin.

In addition to the above mentioned cross-linked atactic or amorphous polymers the composition of the present invention can also comprise other types of olefin polymers. The polymers added are preferably those that present a certain degree of crystallinity. For example, said olefin polymers are selected from: low-density polyethylene (LDPE), high-density polyethylene (HDPE), isotactic polypropylene, or random copolymers of propylene with ethylene and/or a $C_4$–$C_8$ α-olefin, and mixtures of the above mentioned isotactic polypropylene or random copolymers with ethylene-propylene rubbers (EPR), or ethylene-propylene-diene rubbers (EPDM). The $C_4$–$C_8$ α-olefins in said copolymers, linear or branched, are preferably selected from 1-butene, 1-pentene, 4-methyl-1-pentene, 1-hexene, and 1-octene. The α-olefin particularly preferred is the 1-butene.

Examples of the above mentioned mixtures are the heterophasic polypropylene compositions comprising (by weight):

A) from 10 to 60 parts of a propylene homopolymer or a random copolymer of propylene with ethylene and/or a $C_4$–$C_8$ α-olefin, containing more than 80% of propylene, and having an insolubility in xylene at ambient temperature greater than 80%;

B) from 0 to 25 parts, preferably from 1 to 25 parts, of an essentially linear semicrystalline ethylene copolymer comprising propylene and/or a $C_4$–$C_8$ α-olefin, insoluble in xylene at ambient temperature;

C) from 15 to 87 parts of an ethylene copolymer with propylene and/or a $C_4$–$C_8$ αolefin, and optionally minor quantities of diene, soluble in xylene at ambient temperature.

Fraction (A) is present in the heterophasic polypropylene composition preferably in quantities ranging from 10 to 50 parts by weight, and it preferably consists of a propylene homopolymer with an insolubility in xylene at ambient temperature greater than 90% by weight, more preferably from 95 to 98%, or a copolymer containing more than 85% by weight of propylene, more preferably from 90 to 99%.

Fraction (B) is present in the heterophasic polypropylene composition preferably in quantities ranging from 7 to 15 parts by weight, and has preferably a crystallinity ranging about from 20 to 60%, determined by way of Differential Scanning Calorimetry (DSC). The copolymer constituting said fraction is selected preferably from the following types of copolymers: ethylene-propylene, containing more than 55% by weight of ethylene; ethylene-propylene-($C_4$–$C_8$ α-olefin), containing from 1 to 10% by weight of said α-olefin and from 55% to 98% by weight, preferably from 80 to 95%, of ethylene and said α-olefin; ethylene-($C_4$–$C_8$ α-olefin), containing from 55% to 98% by weight, preferably from 80 to 95%, of said α-olefin.

Fraction (C) is present in the polypropylene heterophasic composition preferably in quantities ranging from 30 to 75 parts per weight, and it preferably consists of a copolymer selected from: an ethylene-propylene copolymer containing from 15 to 70% by weight of ethylene, preferably from 20 to 60%; an ethylene-propylene-α-olefin copolymer containing from 1 to 10% by weight of said α-olefin, preferably from 1 to 5%, where the total quantity of ethylene and the α-olefin ranges from 20 to less than 40% by weight; an ethylene-($C_4$–$C_8$ α-olefin) copolymer containing from 20 to less than 40% by weight of said α-olefin, preferably from 20 to 38%, more preferably from 25 to 38%. The dienes optionally comprised in the copolymers of said fraction, are present in quantities preferably ranging from 0.5 to 10% by weight, preferably from 1 to 5%, and are selected preferably from: 1,3-butadiene, 1,4-hexadiene, 1,5-hexadiene, and 2-ethylidene-5-norbornene.

The heterophasic polypropylene compositions are prepared either by mechanically blending components (A), (B), and (C) in the molten state, or by a sequential polymerization process carried out in two or more stages, and using highly stereospecific Ziegler-Natta catalysts.

Examples of the above mentioned heterophasic polypropylene compositions, as well as the catalysts and polymerization processes commonly used for their preparation, are described in published European patent applications Nos. 400333 and 472946.

The quantity of said olefin polymers varies from around 10 to 75%, preferably from 20 to 60%, more preferably from 20 to 55%, by weight with respect to the total weight of the composition.

The above mentioned olefin polymers present in the composition of the present invention can be either cross-linked or uncross-linked.

The composition of the present invention can also contain the additives commonly added to olefin polymers, such as mineral fillers, carbon black, organic and/or inorganic dies, and stabilizers.

The cross-linked polymers and cross-linked compositions of the present invention are soluble in xylene (determined as described below) in quantities preferably ranging from 20 to 95% by weight, more preferably from 30 to 95%.

A further object of the present invention is a process for the preparation of the above mentioned cross-linked polymers and cross-linked composition, which comprises subjecting to cross-linking at least one essentially atactic propylene homopolymer or an amorphous random copolymer of propylene with ethylene and/or at least one $C_4$–$C_{10}$ α-olefin; said cross-linking is carried out in the presence of at least one cross-linking agent (a), and a cross-linking coagent (b).

The cross-linking agent is preferably an organic peroxide selected from those normally used for cross-linking. Said peroxide is preferably selected from those having a half-life ranging about from 10 seconds to 20 minutes, at cross-linking temperatures. Said temperatures vary about from 140° C. to 240° C. Specific examples of said organic peroxides are: dicumyl peroxide, α,α'-bis(tert-butyl peroxy) -m- and/or p-diisopropyl benzene (TBPDB), 1,1-di(tert-butyl peroxy)-3,5,5-trimethylcyclohexane. 2,5-dimethyl-2, 5-di(tert-butyl peroxy) hexane, di-tert-butyl peroxide isopropyl benzene, monocumyl(tert-butyl)peroxide, di(tert-butyl)peroxide.

The cross-linking coagent of the process of the present invention is selected from those commonly used for this purpose. Examples of preferred coagents are the furane derivatives of general formula (I) and (II)

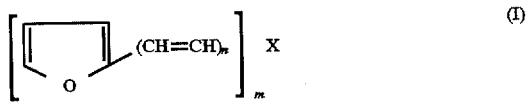

where X is selected from the CHO, COOH, $CONH_2$, —CO—, CN, $NO_2$, —COOCO—, COOR, $CH_2$—CO—$CH_2$—COOR and $CH(COOR)_2$ radicals, where R is a $C_6$–$C_8$ aryl radical (such as phenyl), or $C_1$–$C_4$ alkyl radical (such as methyl and ethyl); n is 1 or 2, and m is an integer that corresponds to the free valance of X;

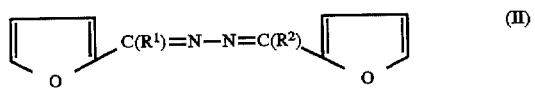

where $R^1$ and $R^2$, are the same or different, and are selected from the hydrogen, $C_1$–$C_4$ alkyl (such as methyl and ethyl) radicals, and $C_5$–$C_8$ cycloalkyl radicals, preferably $C_6$–$C_8$.

Preferred examples of general formulas (I) and (II) are the 1,5-difurfuryl-1,4-pentadiene-3-one, and difurfuraldazine. Other examples of coagents are: 1,2-polybutadiene, triallyl cyanurate, triallyl isocyanurate, and derivatives of methacrylates and acrylates compounds, such as ethylene glycol dimethyl cyanurate, and derivatives of sulfur.

Other suitable compounds are, for example, those described in U.S. Pat. No. 3,301,837, such as β-(α-furyl)-acroleine, 5-(α-furyl)-acrylonitrile, β-(α-furyl)-acrylic acid and its esters, bis-furfurylidene acetone, β-(α-furyl)-ethyl-β-(α-acrolein), esters of furfurylidene malonic acid, and condensation products of β-(α-furylacrolein) with cyclic ketones as described in Chem. Berichte 76, 676 (1943). The above mentioned patent also describes the process for the preparation of said compounds.

The quantities of cross-linking agent and coagent that can be used depend on the degree of cross-linking of the final composition that one wishes to obtain. Said quantities can be easily calculated following criteria that are well known to the experts in the field, based on the activity and functionality of the cross-linking agent and coagent used. For example, the quantity of cross-linking agent can vary from 0.1 to 8% by weight, more preferably from 0.5 to 5%, with respect to the weight of the polymer to be cross-linked. In terms of the cross-linking coagent, said quantity generally ranges from 0.01 to 8% by weight, preferably from 0.05 to 3%, with respect to the weight of the polymer to be cross-linked.

In addition to the polymer and the above mentioned components (a) and (b), the mixture to be subjected to the above mentioned cross-linking process can also comprise various types of additives and cross-linking and/or processing coadjuvants, that according to the known art are normally added to the cross-linking systems used up to now. Examples of additives are: stabilizers, such as antioxidants, organic or inorganic dies or mixtures thereof; examples of coadjuvants are: mineral fillers, hydrocarbon extender oils (such as Celtis 911 oil), zinc and magnesium oxides, stearic acid or its salts (such as Zn, Ca, and Mg).

The cross-linking of the polymer of the present invention can be carried out by using the processes and techniques known in the cross-linking field.

An example of a possible cross-linking process is the process (hereinafter referred to as process A) that is carried out by subjecting to shear stress, generally by way of mastication and/or mixing, the polymer to be cross-linked together with the above mentioned components (a) and (b) (and optionally some of the other components mentioned above) at a temperature adequate for obtaining the cross-linking of the atactic or amorphous propylene polymer. As an alternative, the cross-linking agent can also be added during or after the first stage of mixing and/or mastication. During the shear stress phase the temperature must be at least equal to the one needed for the softening of the polymer to be cross-linked. For example the operation takes place at temperatures that are equal to or higher than 70° C.

The initial mixing of the polymer with components (a) and (b), and optionally with other components, as well as the cross-linking of the mixture itself, is carried out in a special apparatus equipped with mixing elements, such as an internal mixer, or an extruder, or a system comprising an internal mixer and an extruder, or in an open mixer, operating at a temperature that allows the polymer to cross-link. For example, one can use a Banbury mixer, or a single-screw Buss extruder, or a twin-screw extruder with mixing elements.

The duration of the cross-linking depends on the half-time of the cross-linking agent used. The cross-linking is over when there is no more cross-linking agent present in the composition. Generally speaking the cross-linking times preferably range from 40 seconds to 10 minutes.

Normally the cross-linking temperature used during the cross-linking process ranges from 140° C. to 240° C., preferably from 180° C. to 220° C.

The choice of the times regarding the addition of the above mentioned olefin polymers to the atactic or amorphous propylene polymers depends mainly on the type of cross-linking process used, or whether or not said olefin polymer is also expected to cross-link. Consequently the addition of the olefin polymers can be done before or after the cross-linking process, or at any stage of the cross-linking process.

Preferably the addition of the above mentioned olefin polymers to the atactic or amorphous propylene polymer is done after the cross-linking of the atactic or amorphous polymer has occurred.

An additional object of the present invention concerns foamed polymers and polymer compositions produced from the above mentioned cross-linked atactic or amorphous polymers and cross-linked polymer compositions, and the manufactured foamed products obtained from them.

The above mentioned foamed polymers and polymer compositions are flexible and soft. Said properties make said foamed polymers and polymer compositions adequate for a number of possible applications, such as the automotive sector for example, particularly in the manufacture of parts for car interiors, such as the head-rests. Steering-wheels and arm-rests, or other sectors such as in the production of wheels for baby carriages, shock-absorbing structures, etc.

Presently the material used the most for the production of said articles is foamed polyurethane, for its characteristics regarding softness and flexibility.

However, the polyurethane does present some inconveniences that make its replacement with other materials very desirable. For example, the high cost of polyurethane creates the need for the use of materials with chemical-physical properties that are comparable but cost less, such as olefin polymers.

Another inconvenience of the polyurethane is connected with problems of toxicity, which can be present because of the toxic substances, such as the isocyanates for example, that are used during the course of its production, or that may develop in case of combustion, especially in the case of foamed polyurethane.

The foamed polymers and polymer compositions of the present invention have a density that ranges preferably from 0.1 to 0.5 g/mL.

For the purpose of obtaining the foamed polymers and polymer compositions, and the foamed articles of the present invention the processes and blowing agents commonly known in the art can be used.

The blowing agents that can be used are of either a chemical or a physical nature. In the first case their decomposition temperature ranges about from 170° C. to 220° C.

The chemical blowing agents that can be conveniently used generate gas during thermal decomposition or due to chemical reactions. Examples of said blowing agents are: p-toluensulfonylsemicarbazides, dinitropentamethylenetetramines, sulfonyldrazides, azodicarbonamides, tridrazine-triazine, phenyl sulfone, barium azodicarboxylate, sodium borohydrate, gypsum, and alumina trihydrates, mixtures of sodium carbonate and citric acid, and generally speaking all the products used in the art for this purpose where the decomposition temperature is at least equal to the softening temperature of the polymer to be cross-linked.

All the physical type of blowing agents known can be used, for example: light aliphatic hydrocarbons, optionally fluorinated and/or chlorinated, having a boiling point greater than 25° C., such as pentane, hexane, dichlorotrifluoroethanes, methylene chloride; or gaseous or liquid compounds having a boiling point lower than 25° C., such as air, nitrogen, carbon dioxide, chlorofluoromethane, dichlorodifluoromethane, propane, butane, and isobutane.

In the processes for the preparation of foamed polymers and foamed polymer compositions one can use the extruders commonly used in the art, such as single-screw or twin-screw extruders. The physical type blowing agents are preferably injected or introduced into the molten polymer mass in the extruder at a distance from the solid polymer feed point where said polymer is found in a melted and homogeneous form. In the section of the extruder where the blowing agent is introduced the temperature preferably ranges from 125° C. to 250° C. The chemical type blowing agents can be mechanically blended with the solid polymer before extrusion. The resulting dry blend is then introduced in the first feed zone of the extruder, which is maintained at a temperature ranging from 130° C. to 200° C. The temperature maintained at the output of the extruder equipped with a suitable die, such as flat or with circular holes for example, is the one that's most suitable for the foaming of the polymer. Preferably said temperature ranges from 125° C. to 180° C.

Foamed polymer and polymer compositions can be obtained during the preparation of the cross-linked polymer or cross-linked composition, for example by feeding into a twin-screw extruder an atactic or amorphous propylene polymer mixture, a cross-linking consent, and, preferably, one of the crystalline olefin polymers mentioned above, in particular a propylene polymer. At a certain distance from the feed point of the extruder, for example at ⅔ of the length of the extruder, one introduces the molten mixture both the cross-linking agent and the blowing agent, allowing the mixture to continue along the length of the extruder, so that the expansion occurs at the output of the extruder. In this case the temperature of the extruder is generally maintained between 170° C. and 220° C.

According to another method one can prepare in advance, in an open mixer, a polymer ribbon (band) comprising the atactic or amorphous propylene polymer, and the cross-linking agent and coagent. Said ribbon is then introduced into a twin-screw extruder. At a certain distance from the feed point of the extruder, after the cross-linking process has began, one introduces a blowing agent, and optionally an olefin polymer different from the atactic or amorphous propylene polymer in the molten mixture, allowing the mixture to flow along the length of the extruder thus causing the foaming to occur at the output of the extruder. In this case also the temperature is generally maintained between 170° C. and 220° C.

An alternative process provides for the preparation of a mixture (I) comprising the cross-linked polymer or composition of the present invention, and a blowing agent, subsequently said mixture (I) is extruded in a homogenizing single-screw extruder. The operating temperature ranges from about 180° C. to 200° C.

Another process consists of preparing in a properly selected blender, such as a Brabender for example, a mixture comprising the atactic or amorphous propylene polymer, a cross-linking agent, a cross-linking coagent, and a blowing agent. The mixing temperature is equal to or higher than the softening point of the polymer to be cross-linked, but lower than the cross-linking temperature. Subsequently this mixture is compression molded in a hot mold that is completely filled with the mixture; the temperature of the mold is at least equal to the decomposition temperature of the expanding agent, and high enough to induce cross-linking, The mold is then opened to allow the polymer to foam. As an alternate method, the mixture can be allowed to foam directly into the mold, in which case said mold is only half filled.

Thanks to the use of cross-linked atactic or amorphous propylene polymers, and the above mentioned compositions that comprise them, it is now also possible to produce articles of foamed olefin polymers using a process that allows one to extract from the mold a finished product, i.e., already foamed.

The advantage derived from the use of cross-linked atactic or amorphous propylene polymers and the cross-linked compositions of the present invention to produce foamed articles is, therefore, being able to mold the foamed products directly in the desired dimensions.

Consequently, an additional object of the present invention is a process that comprises:

1) subjecting to cross-linking an essentially atactic propylene homopolymer or an amorphous random copolymer of propylene with ethylene and/or at least one $C_4$–$C_{10}$ α-olefin, or a polymer composition containing an essentially atactic propylene homopolymer, or an amorphous random copolymer of propylene with ethylene and/or at least one $C_4$–$C_{10}$ α-olefin; said cross-linking being carried out in the presence of at least one cross-linking agent (a), and one cross-linking coagent (b);

2) preparing a dry blend composition comprising the cross-linked polymer or cross-linked composition obtained in stage (1), and a chemical blowing agent; and 3) introducing the dryblend composition obtained in stage (2) in an injection press equipped with a homogenizing screw that allows the blend to be kept under compression and the temperature is at least equal to the decomposition temperature of the blowing agent. The product is injected into a mold equipped with vents, having a temperature lower than the crystallization temperature of the cross-linked polymer or the cross-linked polymer composition.

In said process, the cross-linking in stage (1) is preferably carried out as described in process (A) above.

In stage (2) of said process, carried out in a blender at room temperature for example, one adds to the cross-linked polymer or cross-linked polymer composition of stage (1), a blowing agent, and preferably also an olefin polymer different from the atactic or amorphous propylene polymer, selected preferably from those mentioned above. The quantity of said olefin polymer varies, for example, from 10 to 75% by weight, preferably from 20 to 60%, more preferably from 20 to 55%, with respect to the total weight of the composition.

The quantity of physical type blowing agent in the above processes preferably ranges from 0.5 to 30% by weight, more preferably from 0.5 to 15%, with respect to the polymer or polymer composition to be foamed.

The quantity of chemical type blowing agent preferably ranges from 0.2 to 10% by weight, more preferably from 0.3 to 5%, with respect to the polymer or polymer composition to be foamed.

It may also be advisable to add to the polymer mass, prior to the foaming phase, one or more nucleating agents (foaming nucleating agents). The quantity of said agents generally ranges from 0.05% to 3% by weight with respect to the polymer. Examples of the above mentioned nucleating agents are talc and colloidal silica.

Other additives, pigments, or fillers that may optionally be required are preferably added prior to the foaming phase.

The following examples are given in order to illustrate and not limit the present invention.

The trademarks and acronyms indicated in the examples correspond to the following products:

Moplen EP 3C 37F: propylene copolymer with 2.6% by weight of ethylene, and 5.2% by weight of butene, insoluble in xylene at ambient temperature: 93%, MIL: 8 g/10 min;

Moplen H30S: isotactic polypropylene, insoluble in xylene at ambient temperature: 96.5%, MIL: 35 g/10 min.

Peroximon F40 MG: dibutylperoxy isopropylbenzene (40%)+EPR (60%);

Trigonox 101/40 MD GR: 2,5-dimethyl-2,5-di(tert-butylperoxy) hexane;

VP-3: difurfuraldazine;

Chimassorb 944: poly{[6-(1,1,3,3-tetramethylbutyl)-imine]-1,3,5-triazine-2,4-diyl][2-(2,2,6,6-tetramethylpiperidyl)-amino]hexamethylene-[4-(2,2,6,6-tetramethylpiperidyl)imine]};

Genitron EP A: azodicarbonamide;

Hydrocerol HK: blend of organic acids, carbonates, and their derivatives;

Hydrocerol CP: blend of organic acids, carbonates, and their derivatives.

Compositions of the polymers used in the examples

Atactic polypropylene (intrinsic viscosity $[\eta]=2.57$ dL/g, $\%(r)-\%(m)=17,8$ and $B=0,99$): it is produced by using as catalyst the dimethylbis(9-fluorenyl)silane zirconium dichloride, $(CH_3)_2Si(Flu)_2ZrCl_2$. European patent application EP-A-604.917 describes said atactic polymer, the polymerization process, and the catalyst used.

2) Heterophasic polypropylene composition (MIL=0.6 g/10 min): it has been obtained by sequential polymerization by using a high yield and highly specific Ziegler-Natta catalyst, supported on magnesium chloride, and comprises (by weight):

A) 35% crystalline propylene copolymer with 3.5% of ethylene;

B) 2% of a propylene-ethylene copolymer fraction insoluble in xylene at ambient temperature;

C) 63% of a propylene-ethylene copolymer fraction containing 27% of ethylene, soluble in xylene at ambient temperature.

The data reported in the examples relative to the following properties of the compositions obtained have been determined by the methods indicated below.

| Properties | Method |
|---|---|
| Melt index (MIL) | ASTM D-1238, condition L |
| Melt index (MIE) | ASTM D-1238, condition E |
| Solubility in xylene | (see note below) |
| Shore A hardness | ASTM D-2240 |
| Shore 00 hardness | ASTM D-2240 |
| Compression set | ASTM D-395, method B |
| Intrinsic viscosity | determined in tetrahydronaphthaline at 135° C. |
| Density | B.S. 4370 |

Determination of percentage soluble in xylene: one prepares a solution of the sample in xylene at a concentration of 1% by weight, maintaining the sample in xylene at 135° C., and stirring the solution for one hour. While continuing to stir, the contents are allowed to cool to 95° C., after which they are poured into a bath with the temperature at 25° C. and kept there for 20 minutes without stirring, and 10 minutes under agitation. The solution is then filtered, and acetone is added to a portion of the filtrate in order to obtain the precipitation of the polymer dissolved. The polymer is then recovered, washed, dried, and weighed in order to determine the percentage soluble in xylene.

EXAMPLE 1

In a Brabender mixer are introduced some of the atactic polypropylene (1) described above, the Peroximon F40 MG, the VP-3, and the Chimassorb 944, in the proportions indicated in Table 1, expressed as parts by weight (p/w). The mixing, carried out at 190° C. at a velocity of 60 rpm, lasts 8 minutes thus effecting the cross-linking of the polymer.

Said cross-linked polymer is then compression molded at 220° C., first at atmospheric pressure for 5 minutes, and then at 200 Bar for 3 minutes, and finally it is cooled to 23° C. in a plate-press at a pressure of 200 Bar for 5 minutes.

EXAMPLE 2 AND COMPARATIVE EXAMPLE 1C

These in examples are carried out as Example 1, changing only the quantity of cross-linking mixture added to the atactic polypropylene as indicated in Table 1.

EXAMPLES 3, 4, 5, AND 6

First stage: the cross-linked polymer of Examples 1 and 2 is blended with a blowing agent for 4 minutes in a Brabender mixer operating at 60 rpm, and at a temperature of 140° C. To the polymer of Example 1 is added some low-density polyethylene (LDPE), having a density of 0.92 g/mL, MIE of 4 g/10 min (Example 3), while either nothing is added to the polymer of Example 2 (Example 4), or one adds some high-density polyethylene (HDPE) having a MIE of 80 g/10 min (Example 5), or a propylene copolymer with ethylene and butene (Example 6). Table 2 shows the quantities of polymer and blowing agent added.

Second stage: the blend is then compression molded, filling the mold entirely with the blend, at 220° C. and 200 Bar for 3 minutes, in a mold that is appropriate for producing a 1.5 mm thick specimen. The polymer is then allowed to foam by opening the mold.

Table 2 shows the characteristics of the resulting foamed products.

EXAMPLE 7

The mixture obtained in the second stage of Example 3, before cooling off, is placed in a press with a mold adequate to produce a 1.5 mm thick specimen, at 23° C.

The specimen obtained is then placed in an oven at 220° C. for 5 minutes. The foamed product shows an excellent degree of foaming with big and uniform cells and a density of 0.184 g/mL.

EXAMPLE 8

First stage: the above mentioned atactic polypropylene (1), the isotactic polypropylene Moplen H30S, and the heterophasic polypropylene composition (2), are introduced, together with the VP3, into a Banbury Pomini PL4 mixer with a 3 liter capacity, operating at a speed of 160 rpm, and having an initial temperature of 120° C. After one minute of mixing at 125°–135° C. the Trigonox 101/40 MD GR peroxide is introduced. The mixing is continued for an additional 7 minutes at a temperature of 210° C., until the cross-linking is completed, at which time the product is discharged.

The product is then converted into pellets by using a Brabender extruder equipped with a strand cutting device.

Table 3 shows, in parts by weight, the quantities of polymers used, and the quantity and components of the cross-linking mixture.

Second stage: the resulting pellets, and 0.5% by weight of azodicarbonamide are mixed in a dry blender at ambient temperature, and then introduced in a Battenfeld BA/125 CD injection press, with a screw diameter of 25 mm and at a temperature of 210° C., that pushes the foamed material into a spherical mold with a diameter of 60mm at a temperature of 60° C. The cooling time is 30 seconds.

The resulting product is in the form of a foamed sphere with a 60 mm diameter having the characteristics shown in Table 4.

EXAMPLE 9

In a Brabender mixer are introduced the above mentioned atactic polypropylene (1), the Peroximon F40 MG peroxide, the cross-linking coagent, and the blowing agent, in the proportions indicated in Table 4 expressed in parts by weight (p/w). The mixing, which lasts 4 minutes, is carried out at 130° C. at a speed of 60 rpm.

The resulting blend is then compression molded at 220° C. for 3 minutes, then the mold is quickly opened to allow for the foaming to occur. Table 4 shows the characteristics of the foamed product obtained.

TABLE 1

| Examples and comparative example | 1 | 2 | 1c |
|---|---|---|---|
| Atactic polypropylene (p/w) | 100 | 100 | 100 |
| Peroximon F40 MG (p/w) | 3 | 3 | — |
| VP-3 (p/w) | 0.90 | 0.45 | — |
| Chimassorb 944 (p/w) | 0.45 | 0.45 | — |
| Properties of the polymers after compression molding | | | |
| Shore A hardness (5") points | 27 | 18 | 38 |
| Soluble in xylene % weight | 30.9 | 94.6 | 100 |
| I.V. of soluble dL/g | 0.84 | 1.16 | 2.60 |
| Insoluble in xylene % weight | 69.1 | 5.4 | 0 |
| MI dg/min (230° C.; 2.16 kg) | 0.105 | 16.3 | 0.106 |
| Compression set 22h 70° C. % | 30 | — | (1) |

(1) the polymer has minimal elastic properties at the temperature of 70° C.; compression set is about 85% at 70° C.

TABLE 2

| Examples | 3 | 4 | 5 | 6 |
|---|---|---|---|---|
| First stage: mixing in Brabender | | | | |
| Cross-linked polypropylene of Ex. 1 (p/w) | 60 | — | — | — |
| Cross-linked polypropylene of Ex. 2 (p/w) | — | 100 | 60 | 60 |
| LDPE[1] (p/w) | 40 | — | — | — |
| HDPE[2] (p/w) | — | — | 40 | — |
| EP 3C 37F (p/w) | — | — | — | 40 |

TABLE 2-continued

| Examples | 3 | 4 | 5 | 6 |
|---|---|---|---|---|
| Genitron EP A (p/w) | 5 | 5 | — | — |
| Hydrocerol HK (p/w) | — | — | — | 5 |
| Hydrocerol CP (p/w) | — | — | 5 | — |
| Second stage: compression molding | | | | |
| Density (g/mL) | 0.135 | 0.245 | 0.440 | 0.300 |
| Shore 00 hard. (points) | 53 | 32 | 57 | 55 |
| Appearance of foamed cells | medium | micro | medium | medium |
| Tackiness | none | high | medium | medium |

[1] density of 0.92 g/mL, MIE: 4 g/10 min;
[2] MIE: 80 g/10 min.

TABLE 3

| Example | 8 |
|---|---|
| Atactic polypropylene (p/w) | 45 |
| Heterophasic composition (p/w) | 30 |
| Moplen H30S (p/w) | 25 |
| Trigonox 101/40 (p/w) | 2.5 |
| VP-3 (p/w) | 0.36 |
| Properties of the polymer after molding | |
| Density g/cm$^3$ | 0.25 |
| Homogeneity of closed cells | excellent |
| Shore hardness A[1] (points) | 50 |
| MI dg/min (230° C.; 2, 16 kg) | 1.5 |

[1] after 5 seconds.

TABLE 4

| Example | 9 |
|---|---|
| Atactic polypropylene (p/w) | 100 |
| VP-3 (p/w) | 0.9 |
| Peroximon F40 MG (p/w) | 3.0 |
| Genitron EP A (p/w) | 5.0 |
| Properties (compression molding) | |
| Density (g/mL) | 0.200 |
| Appearance of foamed cells | micro |
| Tackiness | slight |
| Shore hardness 00 (points) | 30 |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. An essentially atactic cross-linked propylene homopolymer or amorphous random copolymer of propylene with ethylene and/or at least one $C_4$–$C_{10}$ α-olefin.

2. The homopolymer or copolymer of claim 1 obtained by cross-linking an atactic or amorphous polymer having the following characteristics:

intrinsic viscosity [η]: ranging from 1 to 3.5 dL/g; and
%(r)–%(m)>0, where. %r is the percentage of the syndiotactic dyads, and %(m) is the percentage of the isotactic dyads.

3. The atactic polymer of claim 2 is an homopolymer having the following further characteristics:

less than 2% of the $CH_2$ groups are contained in the $(CH_2)_n$ sequences where $n \geq 2$; and Bernoulli index (B)=1±0.2.

4. The amorphous polymer of claim 2 is a copolymer having the further following characteristic:

less than 2% of the $CH_2$ groups in the polymer chain are present in $(CH_2)_n$ sequences where n is an even number.

5. The copolymer of claim 1, where the quantity of ethylene ranges from 0.1 to 20% by weight with respect to the weight of the copolymer.

6. A polymer composition comprising from 10 to 90% by weight of a cross-linked polymer selected from an essentially atactic propylene homopolymer, or an amorphous random copolymer of propylene with ethylene and/or at least one $C_4$–$C_{10}$ α-olefin.

7. The composition of claim 6 comprising at least one olefin polymer selected from: low density polyethylene, high density polyethylene, isotactic polypropylene, or random copolymers of propylene with ethylene and/or a $C_4$–$C_8$ α-olefin, and mixtures of the above mentioned isotactic polypropylene or the above mentioned random copolymers with ethylene-propylene rubbers or ethylene-propylene-diene rubbers.

8. The composition of claim 7 where the olefin polymer is present in quantities ranging from 10% to 75% by weight with respect to the total weight of the composition.

9. A process for the preparation of the homopolymer or copolymer of claim 1, which comprises subjecting to cross-linking at least one essentially atactic propylene homopolymer or an amorphous random copolymer of propylene with ethylene and/or at least one $C_4$–$C_{10}$ α-olefin; said cross-linking being carried out in the presence of at least one cross-linking agent (a) and one cross-linking coagent (b).

10. The process of claim 9 where the cross-linking agent is an organic peroxide.

11. The process of claim 9 where the cross-linking coagent is selected from general formulas (I)

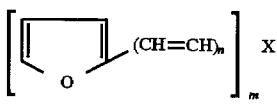

where X is selected from the CHO, COOH, —CO—, $CONH_2$, CN, $NO_2$, —COOCO—, COOR, $CH_2$—CO—$CH_2$—COOR, and $CH(COOR)_2$, radicals, where R is a $C_6$–$C_8$ alkyl radical or $C_1$–$C_4$ alkyl group; n is 1 or 2, and m is an integer corresponding to the free valence of X; and (II)

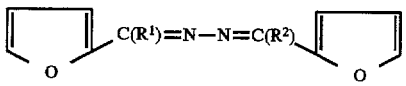

where $R^1$ and $R^2$, are the same or different and, are selected from hydrogen, $C_1$–$C_4$ alkyl radicals, and $C_5$–$C_8$ cycloalkyl radicals.

12. The process of claim 9 where the mixture is subjected to shear stress at a temperature high enough to soften the atactic propylene homopoller or the amorphous random copolder of propylene with ethylene and/or at least one $C_4$–$C_{10}$ α-olefin.

13. an essentially atactic cross-linked propylene homopolymer or amorphous random copolder of propylene with ethylene and/or at least one $C_4$–$C_{10}$ α-olefin obtained by a cross-linking process comprising subjecting to cross-linking at least one essentially atactic propylene homopolymer or an amorphous random copolymer of propylene with ethylene and/or at least one $C_4$–$C_{10}$ α-olefin in the presence of at least one cross-linking agent (a) and one cross-linking coagent (b).

14. A foamed polymer or polymer composition obtained by foaming the homopolymers or copolymers of claim 1.

15. A foamed polymer or polymer composition obtained by foaming the homopolymers or copolymers of claim 6.

16. A foamed article obtained from the foamed polymer or polymer composition of claim 14.

17. A process for the production of the polymer or composition of claim 14 that comprises:

1) subjecting to cross-linking an essentially atactic propylene homopolymer or an amorphous random copolymer of propylene with ethylene and/or at least one $C_4$–$C_{10}$ α-olefin, or a polymer composition containing an essentially atactic propylene homopolymer or an amorphous random copolymer of propylene with ethylene and/or at least one $C_4$–$C_{10}$ α-olefin; said cross-linking being carried out in the presence of at least one cross-linking agent (a), and one cross-linking coagent (b);

2) the preparation of a dry blend composition comprising the cross-linked polymer or cross-linked composition obtained in stage (1), and a chemical blowing agent;

3) introducing the dry blend composition obtained in stage (2) in an injection press equipped with a homogenizing screw that allows the blend to be kept under compression and the temperature to be at least equal to the decomposition temperature of the blowing agent; and 4) injecting the product coming from stage (3) from the injection press into a mold equipped with vents, having a temperature lower than the crystallization temperature of the cross-linked polymer or the cross-linked polymer composition.

18. The process of claim 17 where the polymer composition to be cross-linked and foamed comprises at least one olefin polymer selected from: low density polyethylene, high density polyethylene, isotactic polypropylene, or random copolymers of propylene with ethylene and/or a $C_4$–$C_8$ α-olefin, and a mixture of the above mentioned isotactic polypropylene, or the above mentioned random copolymers with ethylene-propylene rubbers or ethylene-propylene-diene rubbers.

19. The process of claim 17 where the first stage is carried out by subjecting to shear stress the polymer or polymer composition to be cross-linked.

20. The process of claim 18 where the first stage is carried out by subjecting to shear stress the polymer or polymer composition to be cross-linked.

* * * * *